(12) United States Patent
Correale

(10) Patent No.: US 7,049,823 B2
(45) Date of Patent: May 23, 2006

(54) IONIZATION VACUUM GAUGE

(75) Inventor: Raffaele Correale, Turin (IT)

(73) Assignee: Varian S.p.A., Torino (IT)

( * ) Notice: Subject to any disclaimer, the term of this patent is extended or adjusted under 35 U.S.C. 154(b) by 57 days.

(21) Appl. No.: 10/910,104

(22) Filed: Aug. 3, 2004

(65) Prior Publication Data

US 2005/0028602 A1    Feb. 10, 2005

(30) Foreign Application Priority Data

Aug. 8, 2003    (IT)    .......................... TO2003A0627

(51) Int. Cl.
*G01L 21/30*    (2006.01)
*G01N 27/62*    (2006.01)
(52) U.S. Cl. ...................... 324/460; 324/464
(58) Field of Classification Search ................ 324/459, 324/460, 464
See application file for complete search history.

(56) References Cited

U.S. PATENT DOCUMENTS

| | | | |
|---|---|---|---|
| 2,605,431 A | 7/1952 | Bayard | ........................ 327/600 |
| 5,278,510 A * | 1/1994 | Baptist et al. | ............... 324/460 |
| 5,767,629 A | 6/1998 | Baptist | ........................ 315/160 |
| 5,973,444 A | 10/1999 | Xu et al. | ..................... 313/309 |
| 6,474,171 B1 * | 11/2002 | Holme et al. | .................. 73/753 |
| 6,566,884 B1 * | 5/2003 | Rutherford et al. | ........... 324/460 |
| 6,663,041 B1 * | 12/2003 | Buschulte et al. | ........ 242/559.1 |
| 6,943,356 B1 * | 9/2005 | Schneiker et al. | ........ 250/423 F |
| 2001/0011890 A1 | 8/2001 | Kawasaki | .................... 324/460 |
| 2003/0057953 A1 | 3/2003 | Rutherford et al. | ........... 324/460 |

FOREIGN PATENT DOCUMENTS

| | | |
|---|---|---|
| DE | 4 137 527 A1 | 5/1993 |
| EP | 0 662 607 A1 | 7/1995 |
| JP | 3 293 533 A1 | 12/1991 |
| JP | 07 099034 A | 4/1995 |
| JP | 10 267780 A | 10/1998 |

* cited by examiner

*Primary Examiner*—Walter Benson
(74) *Attorney, Agent, or Firm*—Bella Fishman

(57) ABSTRACT

An ionisation vacuum gauge for measuring the residual pressure of a gaseous material remaining in a container (10), more particularly after operation of a vacuum pump comprises an electron-emitting cathode (31) made by exploiting the nanotube technology, a grid (13; 33; 133; 133') for accelerating the electrons emitted by the cathode, and a plate (15; 35) collecting the ions and/or the ionised positive molecules of the gas. Measuring the plate current by a galvanometer allows for determining the value of the residual pressure inside the container.

26 Claims, 7 Drawing Sheets

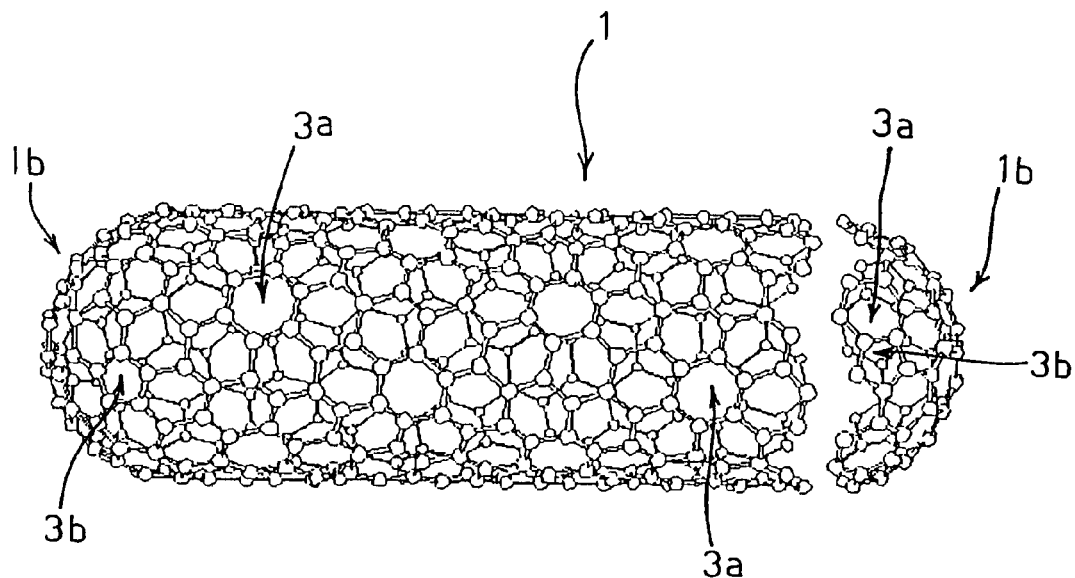
FIG. 1
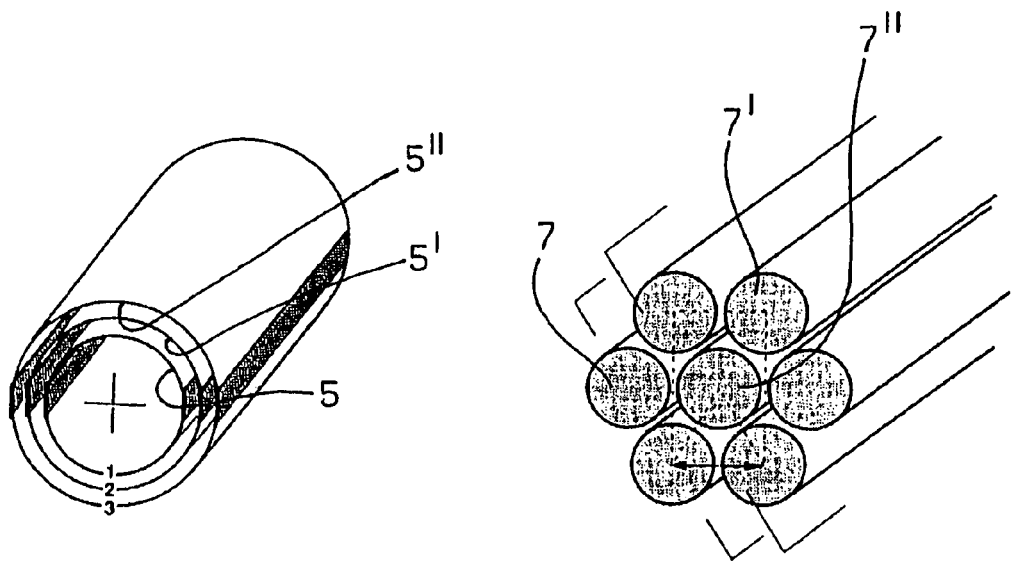
FIG. 2A
FIG. 2B

IONIZATION VACUUM GAUGE

FIELD OF THE INVENTION

The present invention relates to an ionisation vacuum gauge.

More particularly, the present invention relates to an ionisation vacuum gauge for measuring the residual pressure of a gaseous material remaining in a container, for instance, after operation of a vacuum pump, the gauge being of the kind comprising an electron-emitting cathode, a grid for accelerating the electrons emitted by the cathode and a plate collecting the ionised positive molecules of the gas, wherein the measurement of the plate current by a galvanometer allows for determining the value of the residual pressure inside the container.

BACKGROUND OF THE INVENTION

Two kinds of vacuum gauges are known: thermionic emission vacuum gauges (also called hot cathode vacuum gauges), and field emission (or cold cathode) vacuum gauges.

In thermionic emission vacuum gauges, the electron source comprises in one or more filaments, for instance of tungsten, brought to incandescence. A typical example of hot cathode vacuum gauge is the Bayard-Alpert vacuum gauge. That kind of vacuum gauge comprises a wire-shaped ion collecting plate, a cylindrical grid surrounding the plate and an incandescent tungsten filament for electron emission, located outside the grid. The electrons emitted by the filament and accelerated by the grid ionise the residual gas, and the ions and/or the ionised positive molecules are collected by the plate, which is kept at lower potential than the electron source and the grid.

In the disclosed design, the electrons pass several times through the grid and, during such "in" and "out" movement, they ionise the residual gas until they hit the grid and are absorbed by it.

A plate, which is designed as a simple wire allows for pressure measurements as low as about $10^{-9}$ Pa. Indeed, because of the reduced plate wire surface, the background current is minimised due to photoelectric effect from the plate (electron emission) caused by X-rays produced by electrons hitting the grid.

The example of vacuum gauge is disclosed for instance in U.S. Pat. No. 2,605,431 "Ionisation Vacuum Gauge". The major drawback of that kind of vacuum gauges is related to the nature of the electron-emitting cathode. Actually, a heated filament is an isotropic electron source, where directionality of the electron beam is an essential parameter for vacuum gauge sensitivity.

The vacuum gauge sensitivity is not constant, since the distribution of the electron emission changes direction as the temperature along the emitting cathode filament changes, this filament typically reaching temperatures up to about 2000° C.

Moreover, the phenomenon of electron emission by thermionic effect entails high power consumption, long response times and a non-negligible pollution of the surrounding environment due to the release of impurities.

It is the main object of the present invention to overcome the above drawbacks, by providing a miniaturised vacuum gauge, which has a great sensitivity and which does not appreciably perturb the pressure measurements.

The above and other objects are achieved by a vacuum gauge as claimed in the appended claims.

Advantageously, the gauge according to the invention exploits the nanotube technology for making the electron-emitting cathode.

According to such a solution, electron emission takes place by field effect, and not by thermionic effect: application to a nanotube film of a strong electric field, whose flow lines are concentrated at the ends of the nanotubes, results in electron emission.

A nanotube cathode is a so-called "cold" electron source, requiring very low power consumption and having high directionality.

According to a preferred embodiment of the invention, due to the use of such a cathode, it is possible to utilize not only cylindrical geometry of the conventional Bayard-Alpert vacuum gauge but to use different geometries, allowing miniaturising the ionisation vacuum gauge.

More particularly, according to some embodiments of the invention, the electrons continue moving in the space between the grid and the plate, without any appreciable electron amount passing again through the grid.

The preferred embodiments of vacuum gauge according to the invention, given by the way of non-limiting examples, is disclosed in greater detail hereinafter, with reference to the accompanying drawings, in which:

BRIEF DESCRIPTION OF THE DRAWINGS

FIG. 1 is a schematical perspective representation of a nanotube;

FIG. 2A is a schematical representation of a assembling nanotubes for manufacturing a nanotube film for electron emission;

FIG. 2B is another schematical representation of assembling nanotubes for manufacturing a nanotube film for electron emission;

DETAILED DESCRIPTION OF THE INVENTION

Figure 3:
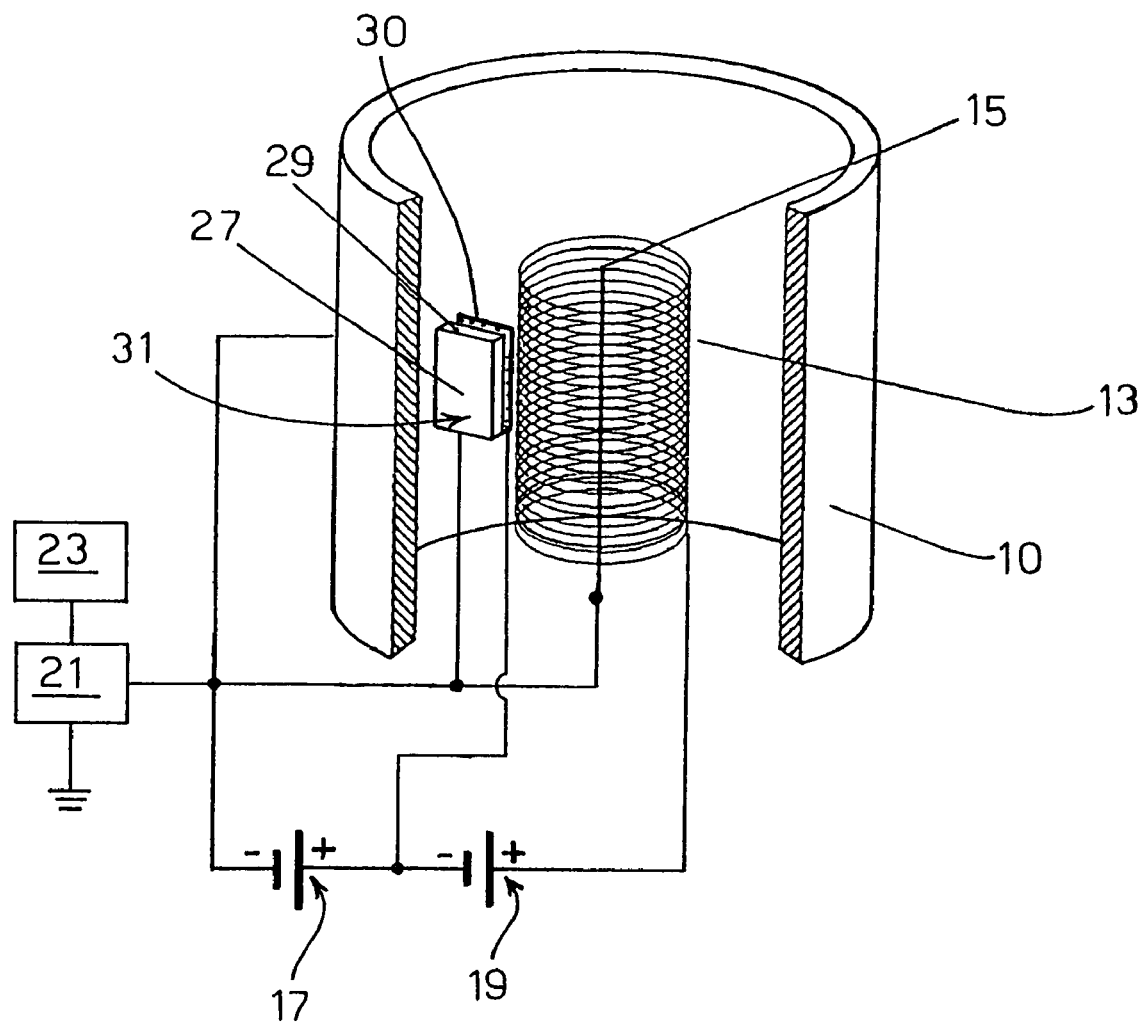
FIGS. 3 to 8 are schematical perspective views of different embodiments of the invention.

Referring to FIG. 1, reference numeral 1 denotes a single-wall carbon nanotube.

Carbon nanotubes are one of the possible forms of crystalline carbon, together with graphite, diamond and fullerenes.

Generally, a single-wall carbon nanotube 1 can be considered as a carbon tube made of a graphite layer rolled up into a cylinder, closed at its ends by two hemispherical caps 1b. The nanotube body is formed only by hexagonal carbon structures 3a, where the end caps are generally formed by both hexagonal structures 3a and pentagonal structures 3b of carbon atoms.

The diameter of a nanotube is generally in a range 0.8 to 10 nm and usually is smaller than 2 nm. The length of a nanotube is generally of the order of $10^4$ to $10^5$ nm, so that nanotubes can be considered monodimensional structures.

Multiple nanotubes assembled into a thin film exhibit optimum field emission capability, i.e. capability of emitting electrons due to the action of a strong electric field, whose flow lines are concentrated at ends 1b of the nanotubes.

In order to exhibit good field emission capability, the nanotubes in the thin film must be arranged in ordered manner.

FIGS. 2A and 2B show two typical modalities for assembling the nanotubes.

In FIG. 2A, a plurality of nanotubes 5, 5', 5" are arranged inside one another, so that they are concentric and form a so-called multiple-wall nanotube.

In FIG. 2B, on the contrary, a plurality of nanotubes 7, 7', 7" are arranged parallel and adjacent to one another, so that they form an ordered bundle.

By using either arrangement described above, a nanotube film with optimum electron emission properties can be obtained.

Turning now to FIG. 3, a vacuum gauge according to the invention is shown. The ionisation vacuum gauge is of the so-called Bayard-Alpert type, which uses a cathode 31 capable of emitting electrons and formed by a nanotube film 29 arranged on a substrate 27.

The vacuum gauge is housed inside a vacuum chamber 10 and it comprises, a nanotube cathode 31 for electron emission, an anode 13 in a shape of a cylindrical grid, capable of accelerating the electrons emitted by the cathode, and a wire-shaped plate or collecting electrode 15, located centrally of anode 13, for collecting the gas ions and ionised positive molecules.

Cathode 31, formed by the thin nanotube film 29 arranged on the substrate 27 according to the arrangement shown in either FIG. 2A or FIG. 2B, is a low-temperature, highly directional, field-emission electron source. An extraction grid 30 is located opposite to film 29, at short distance therefrom, and is connected to a power supply 17 keeping the grid at a potential $V_{30}$ higher than that of the substrate 27, which is grounded. The potential difference between the substrate 27 and the extraction grid 30 generates an electric field, in which nanotube film 29 is immersed and which causes field-effect electron emission by the nanotubes.

The electrons emitted by the cathode 31 are accelerated by grid-shaped anode 13, connected to a second power supply 19 and kept at a potential $V_{13}>V_{30}$. The electrons accelerated in this manner pass through the grid 13 and move towards collecting electrode 15 that, however, being grounded, repels the electrons, causing them to pass again through grid 13. This motion in and out of the grid 13 continues until the electrons are absorbed by the grid itself. During this motion, the electrons ionise the molecules or atoms of the residual gas contained in vacuum chamber 10, so that the ionised molecules or atoms are attracted by the plate 15. The ion current generated on said plate 15 can be measured by means of a galvanometer 21. Suitable signal processing means 23 allows for obtaining the residual gas pressure inside chamber 10 from the value of the ion current, once the current intensity of the electron source of cathode 31 is known.

It is clear that using a nanotube cathode allows for solving many problems inherent in the use of ionisation vacuum gauges. The nanotubes are highly directional electron sources, whereas the conventional heated filament is a substantially isotropic source. Moreover, the power required to apply to the cathode a potential difference sufficient to cause field emission by the nanotubes is far lower than that required to bring the filament to incandescence.

Figure 4:
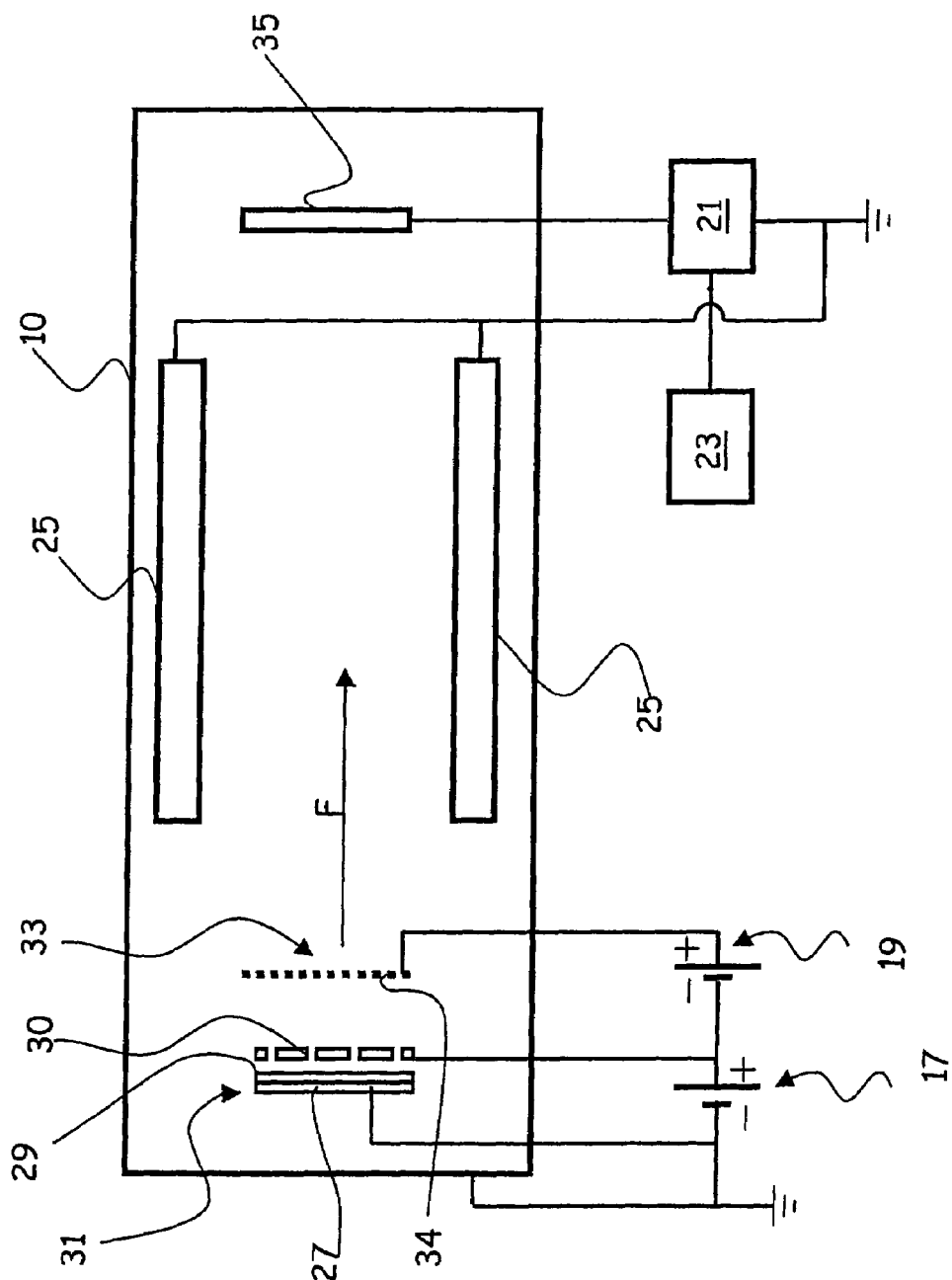

Referring to FIG. 4, there is shown a second embodiment of the vacuum gauge according to the invention. A chamber 10 encloses the volume containing a residual gas, the pressure of which is to be measured. The vacuum gauge substantially comprises: a cathode 31 capable of emitting electrons, which cathode is formed by a nanotube film 29 arranged on a substrate 27 and is provided with an extraction grid 30; a grid-shaped anode 33, capable of accelerating the electrons emitted by cathode 31; and a plate or collecting electrode 35, which is to collect the ions produced by the electron collisions with the gas atoms or molecules.

In that embodiment, anode 33 is made as a substantially plane grid placed opposite to said cathode 31, at a short distance therefrom. Thus, the electrons emitted by cathode 31 are focussed into a beam oriented according to a preferential initial direction (denoted by arrow F), substantially perpendicular to the plane of the grid 33.

It is therefore advantageous to make plate 35 as a plane plate, in register with and substantially parallel to the grid 33.

Note that, in the embodiment shown, cathode 31 and plate 35 are made as plane plates. Such members could however have a different shape as well, e.g. a concave or convex shape. Moreover, plate 35 could be also made as a small bar or a wire. The plane plate shape is however preferable since increasing the plate surface directed towards the electron source results in increasing the sensitivity of the plate.

The electrons, once the cathode 31 due to field effect emits them, are accelerated through holes 34 of grid 33 in a direction perpendicular to the grid, towards plate 35. To this end, like in the previously disclosed embodiment, the grid 33 is suitably biased at a potential $V_{33}$ higher than potential $V_{30}$ at which extraction grid 30 of cathode 31 is set and such that the electrons passing through grid 33 come out therefrom with a kinetic energy preferably in a range 100 to 150 eV, that is, in the most favourable energy range for ionisation of residual gas present in chamber 10.

In order to keep extraction grid 30 of cathode 31 and anode 33 at different potentials, two d.c. power supplies 17, 19 connected in series are provided.

Extraction grid 30 is connected to power supply 17, which keeps the grid at a potential $V_{30}$ higher than that of grounded substrate 27 of nanotube film 29.

The electrons emitted by the cathode 31 are accelerated by grid-shaped anode 33, connected to the second power supply 19 and kept at a potential $V_{33}>V_{30}$.

During their motion between said grid 33 and said plate 35, the electrons collide with the atoms or the molecules of the residual gas, ionising them. When arriving close to the plate 35, the electrons are repelled by the plate, since the plate is grounded. The electrons are also repelled by the walls of chamber 10, which also are grounded, and are directed again towards grid 33, by which they are eventually absorbed after further collisions with the atoms or the molecules of the residual gas.

The ions of the residual gas are on the contrary collected by plate 35, which is connected with a galvanometer 21 for measuring the absorbed ion current. Suitable means 23 for processing the analogue signal generated by galvanometer 21 allows for obtaining the residual gas pressure in chamber 10 from the value of the ion current, once the current intensity of the source consisting in cathode 31 is known.

To obtain a more accurate measurement, also grid 33 can be connected to a second galvanometer (not shown), for measuring the grid electron current due to the electrons absorbed by said grid.

Residual pressure $P_x$ can thus be obtained according to relation:

$$p_x = c \cdot i_p / i_g,$$

where:

c is a constant typical of the apparatus and of the gas nature;

$i_p$ is the plate current intensity;

$i_g$ is the grid current intensity.

Note that using a plane geometry allows for placing the collecting plate at a greater distance from the grid (which, on the contrary, surrounds said plate in the Bayard-Alpert vacuum gauge), thus limiting the background current due to the photoelectric effect of the plate caused by X rays produced on the grid. Consequently, in the vacuum gauge according to the invention, the plate does not need to be reduced to a wire (as in the Bayard-Alpert vacuum gauge), but its surface can be advantageously increased so as to enhance the measurement sensitivity.

Moreover, using the plane geometry for grid-shaped anode 33, together with using a nanotube emitting cathode 31, allows for further miniaturising the vacuum gauge according to the invention.

The cathode 31 and the grid 33 may be spaced apart by tens of micrometres (for instance, 20 to 50 µm), and the distance between the grid 33 and the plate 35 may be for instance in a range from 100 to 500 µm, depending on the sensitivity needed. Clearly indeed, the greater the spacing between the grid 33 and the plate 35, the greater the probability of ionisation of the residual gas contained in chamber 10.

In order to further reduce the size of the vacuum gauge according to the invention, in the embodiment shown in FIG. 4, two magnets 25 (for instance, electromagnets or permanent magnets), formed by grounded plane discs or plates, are located between the grid 33 and the plate 35, in planes perpendicular to both the electrodes 33, 35 and hence parallel to the initial direction of the electron beam.

The magnetic field produced by the magnets 25 affects the motion of the electrons, which follow spiral paths. Thus, the number of collisions of each electron with the atoms or the molecules of the residual gas per unit of linear distance travelled is increased. In other words, with a same geometry, the ionisation degree of the gas, and hence the sensitivity of the vacuum gauge according to the invention, are increased. In the alternative, the distance between grid 33 and plate 35 (and hence the overall dimensions of the vacuum gauge according to the invention) can be reduced, while leaving the ionisation degree of the residual gas and the vacuum gauge sensitivity unchanged.

Figure 5:
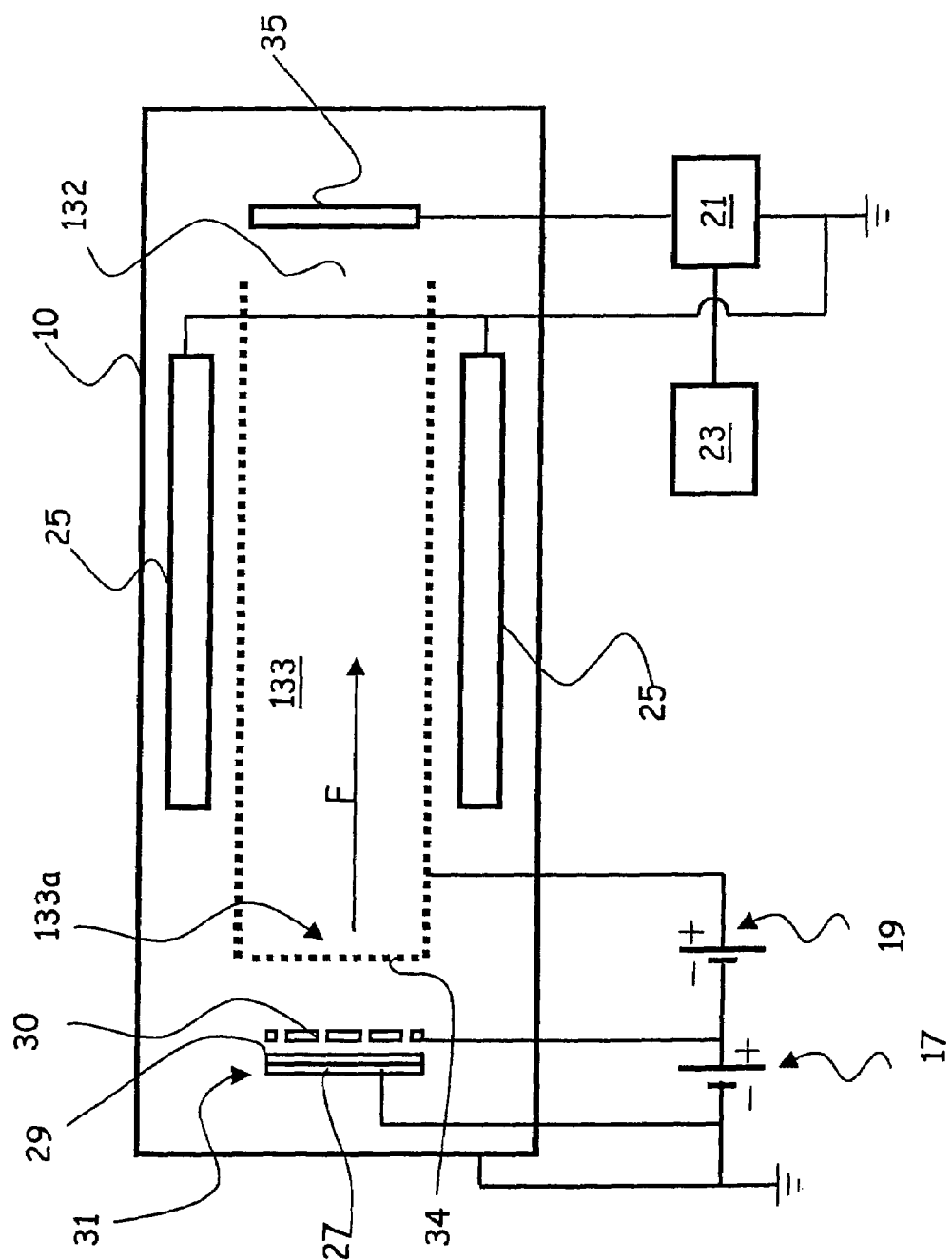

Turning now to FIG. 5, there is shown a third embodiment of the vacuum gauge according to the invention, which differs from the previous ones in a shape of the grid-shaped anode, here denoted by reference numeral 133.

The anode 133 is made as a substantially parallelepiped cage, having a face 133*a* parallel to the cathode 31 and located at a short distance therefrom. Thus, the electrons emitted by cathode 31 are accelerated through the face 133*a* of anode 133 according to a preferential initial direction (denoted by arrow F), substantially perpendicular to the plane of said face 133*a*.

Collecting plate 35 is placed opposite to face 133*a*, in correspondence of open base 132 of grid 133.

Note that using a parallelepiped grid 133 allows for increasing the vacuum gauge sensitivity. Actually, being both plate 35 and the walls of chamber 10 grounded, the ions could be attracted by the walls rather than by plate 35, thereby creating an ion dispersion effect. Use of the parallelepiped grid 133, which is closed except for the opening 132 in correspondence of the plate 35, allows for avoiding ion dispersion and consequently increasing the vacuum gauge sensitivity.

Figure 6:
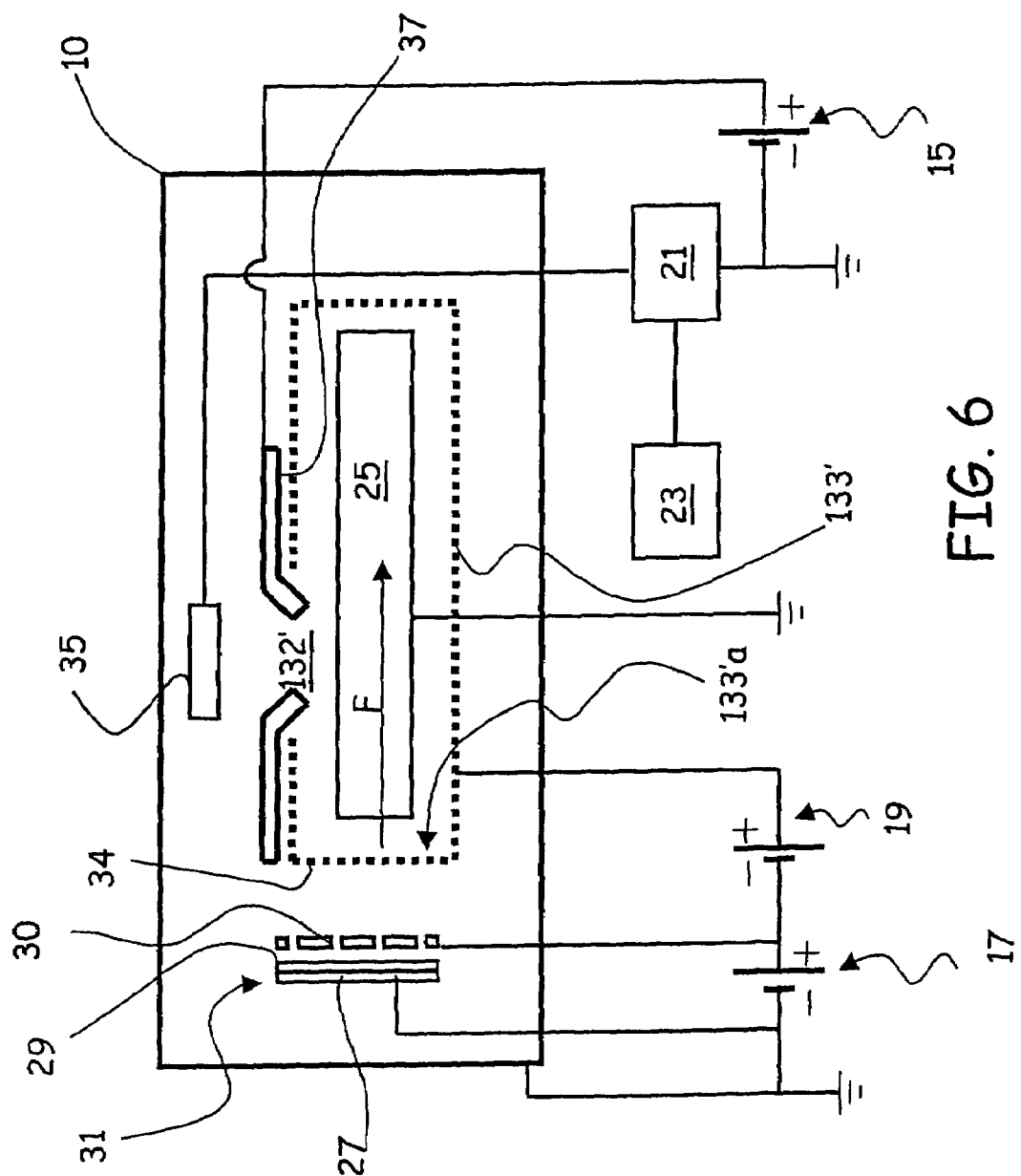

Turning now to FIG. 6, there is shown a fourth embodiment of the vacuum gauge according to the invention, which differs from the previous ones in the arrangement of collecting plate 35.

In the previously disclosed embodiments, the plate 35 is placed opposite to cathode and lies in a plane substantially parallel to the cathode itself and perpendicular to preferential direction F of the electron beam.

On the contrary, in the embodiment of the vacuum gauge according to the invention shown in FIG. 6, plate 35 lies in a plane substantially perpendicular to the plane of cathode 31, and hence it is located in a plane parallel to preferential initial direction F of the electron beam. Thus, the ions and the ionised molecules attracted towards the plate 35 move towards the plate in a direction substantially perpendicular to that of the electron beam.

Thus, interactions between the electron source (cathode 31) and collecting plate 35 are limited. More particularly, the photoelectric effect on plate 35 due to X-rays emitted by grid 133' is significantly limited, whereby the sensitivity of the vacuum gauge according to the invention is further increased.

In this embodiment, grid-shaped anode 133' is suitably equipped with a side opening 132' in correspondence with collecting plate 35.

An extracting device 37 may be provided in correspondence with opening 132' to make ion channelling towards plate 35 easier. The extracting device may comprise, for instance, in an electrostatic lens and it is connected to a power supply 16, such that the extraction device can be brought to a potential intermediate between the potentials of plate 35 (that is grounded) and grid 133'.

This embodiment may be provided with a pair of magnets 25 in order to create a magnetic field causing the electrons to move along spiral paths. In the plate-shaped magnets 25 are advantageously located in planes perpendicular to both cathode 31 and plate 35.

In order to limit the background current due to photoelectric effect of the plate caused by X-rays produced on the grid and, hence, to improve the sensitivity of the vacuum gauge according to the invention, it might be advantageous to place collecting plate 35 at a greater distance from grid-shaped anode 133'. To this aim, means such as magnets, capacitor plates, electrostatic lenses, radiofrequency devices, capable of deflecting a beam of charged particles, could be used.

Figure 7:
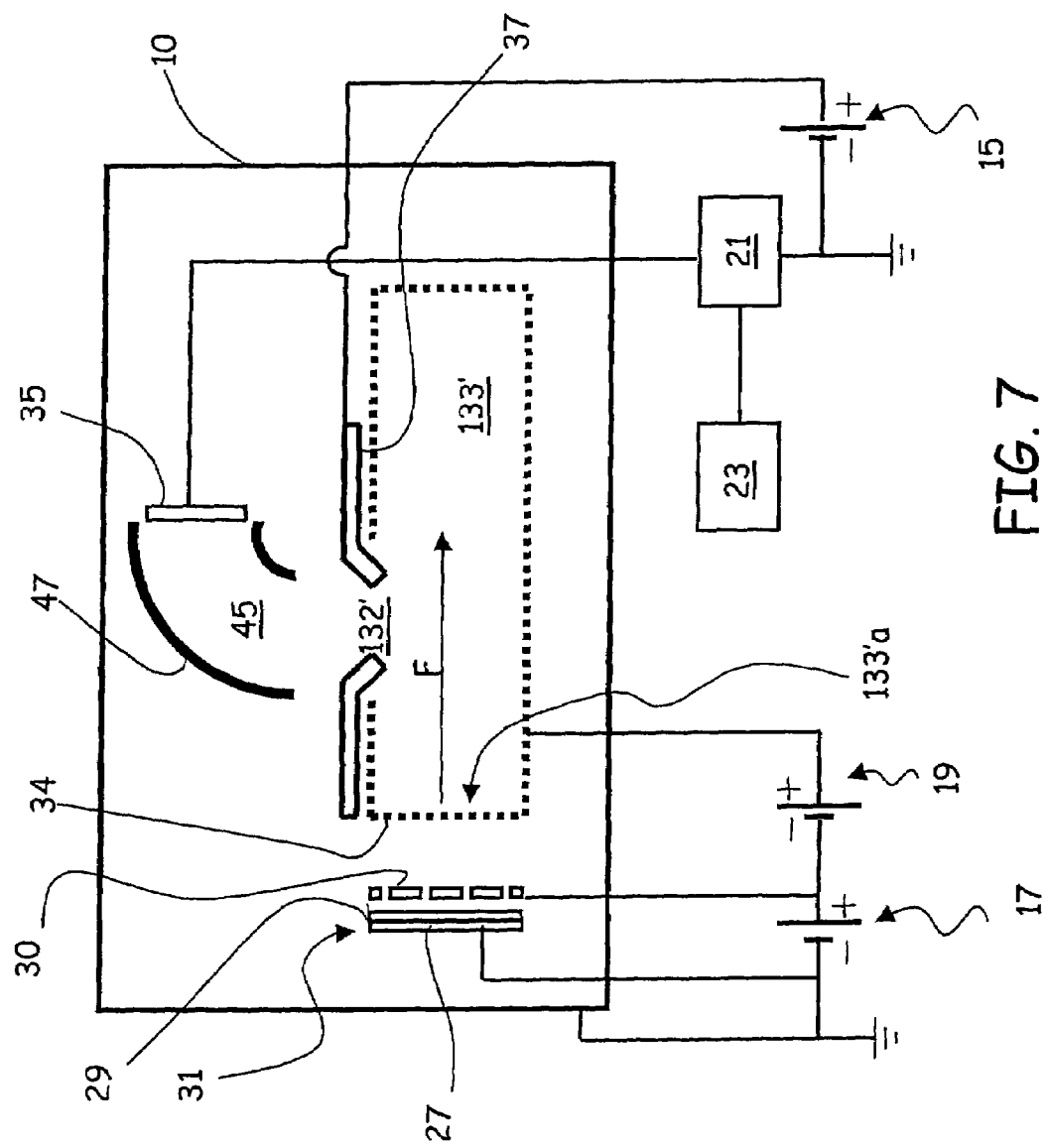

Turning to FIG. 7, there is shown a fifth embodiment of the invention, in which a capacitor 45 is provided, of which plates 47 are suitably biased so as to channel between them the ions or the ionised molecules, so as to deflect their advancing direction by about 90°.

More particularly, one of the plates 47 may be grounded and the other may be brought to a suitable potential to obtain ion paths with the desired curvature radius.

The electrons accelerated by anode 133' collide with the atoms or the molecules of the residual gas and ionise them. The ions or the ionised molecules are channelled into the space between plates 47 of the capacitor 45 and are deflected by 90° towards a plate 35 placed at the exit from the passageway defined between the plates 47.

Figure 8:
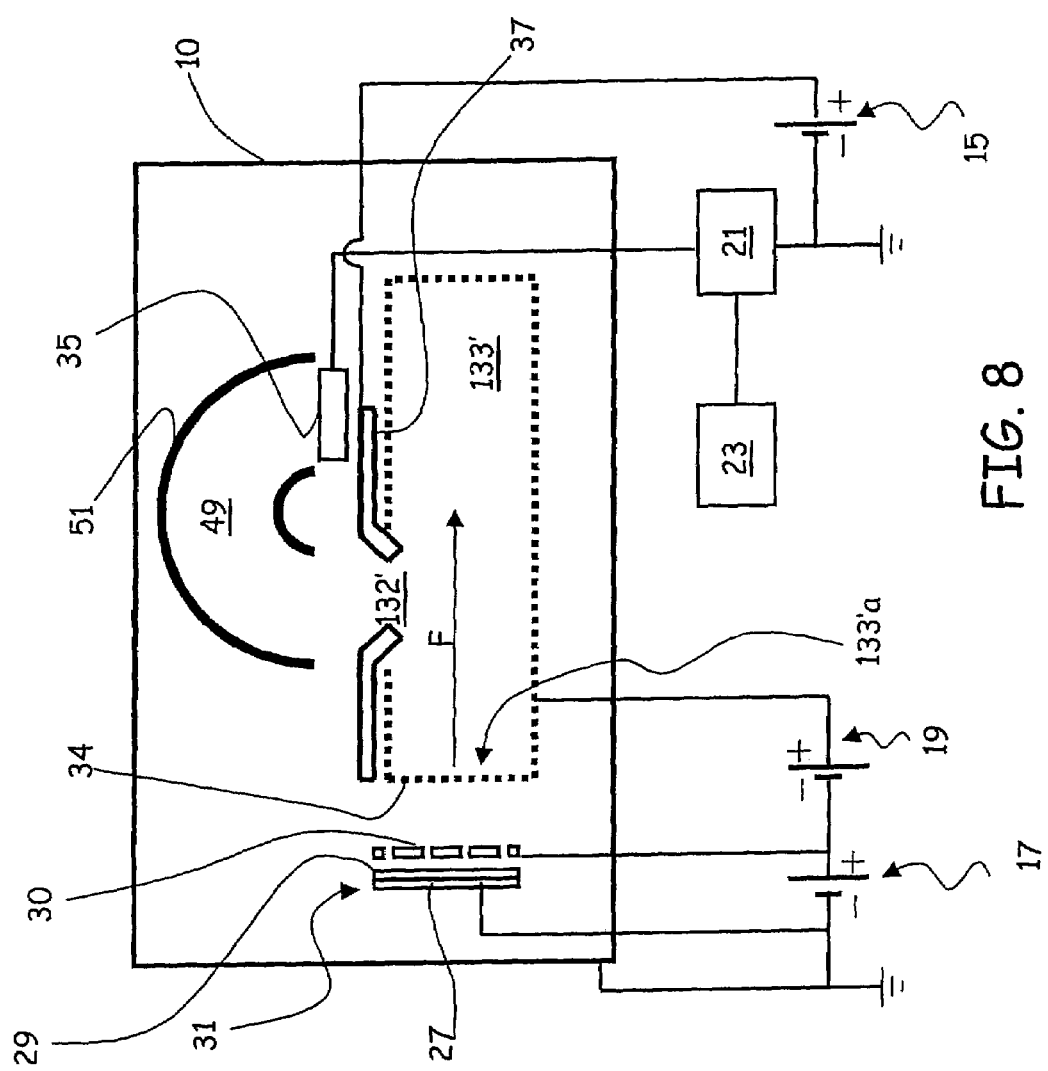

Similarly, in a sixth embodiment of the vacuum gauge according to the invention, shown in FIG. 8, a capacitor 49 may be provided, located between extracting device 37 and collecting plate 35 and having plates 51 that are shaped so as to deflect the direction of the ions or the ionised molecules by about 180°.

The ions or the ionised molecules produced by the collisions of the electrons accelerated by anode 133' are channelled between plates 51 of the capacitor 49 and are deflected by 180° towards the plate 35 placed at the exit from the passageway defined between the plates 51.

Advantageously, according to the latter two embodiments, collecting plate 35 is isolated from the electron beam and the electron source, so that the photoelectric effect due to X-rays produced on grid 133' is significantly reduced.

In the latter two disclosed embodiments described above, a pair of shaped magnets might be used in place of a capacitor for deflecting the ions. In such case, electrical potential $V_m$ between said magnets will be chosen depending on the curvature radius desired for the ion paths, according to relation:

$$m/q = r^2 B^2 / 2(V_{133'} - V_m),$$

where m and q are the mass and the charge, respectively, of the ions to be deflected;

r is the desired curvature radius;

B is the strength of the magnetic field generated by said magnets and;

$V_{133'}$ is the potential of grid 133'.

The skilled in the art will immediately appreciate that the use of the vacuum gauge of the present invention gives important advantages. First, the possibility of constructing a vacuum gauge of substantially reduced size makes the vacuum gauge suitable for any field of application. Still due to its reduced size, the vacuum gauge does not perturb the environment where pressure is to be measured, so that said measurement is more reliable and accurate.

It is clear as well that the above description has been given only by way of non-limiting example and that changes and modifications are possible without departing from the scope of the present invention as claimed.

What is claimed is:

1. An ionisation vacuum gauge for measuring the residual pressure of a gaseous material in a container (10) comprising:
   an electron-emitting cathode (31), said cathode is formed by a plurality of nanotubes, distributed over a surface of said cathode,
   a grid (13; 33; 133; 133') for accelerating the electrons emitted by said cathode,
   a plate (15; 35) for collecting the ionised positive molecules of said gaseous material,
   said plate (35) disposed outside of said accelerating grid (33:133;133') and
   a galvanometer (21) connected to said plate for measuring the plate current to determine the value of the residual pressure inside the container.

2. The vacuum gauge as claimed in claim 1, wherein said cathode (31) comprises a nanotube film (29) and an extraction grid (30) disposed opposite thereto.

3. The vacuum gauge as claimed in claims 2, further comprising:
   a first power supply (17) connected to said extraction grid (30) for keeping said extraction grid (30) at a potential higher than that of said nanotube film (29) and
   a second power supply (31) connected to said accelerating grid (13; 33; 133; 133') for keeping it at a potential higher than that of said extraction grid (30).

4. The vacuum gauge as claimed in claim 3, wherein said film (29) and/or said plate (35) are grounded.

5. The vacuum gauge as claimed in claim 3, wherein the walls of said container (10) are grounded.

6. The vacuum gauge as claimed in claim 1, wherein said cathode (31) comprises a plurality of single-wall carbon nanotubes.

7. The vacuum gauge as claimed in claim 6, wherein said nanotubes comprise each a tubular carbon body made of a graphite layer rolled up into a cylinder and closed at both ends by two hemispherical caps, said body being formed by hexagonal carbon structures (3a) and said caps being formed by both hexagonal structures (3a) and pentagonal structures (3b) of carbon atoms.

8. The vacuum gauge as claimed in claim 7, wherein said nanotubes have diameters in a range 0.8 to 10 nm and lengths in a range of $10^4$ to $10^5$ nm.

9. The vacuum gauge as claimed in claim 8, wherein said nanotubes are disposed inside one another, so as to be concentric and to form a multiple-wall nanotube.

10. The vacuum guage as claimed in claim 5 herein said nanotubes are arranged parallel and adjacent to one another, so as to form an ordered bundle.

11. The vacuum gauge as claimed in claim 1, wherein said accelerating grid (33) is a substantially plane grid.

12. The vacuum gauge as claimed in claim 1, wherein said accelerating grid (133; 133') comprises: a substantially parallelepiped shape; a face (133a; 133'a) substantially parallel with and opposite to said cathode (31) and an opening (132; 132') for extraction of said ions and/or ionised molecules towards said plate (35).

13. The vacuum gauge as claimed in claim 1, wherein the electrons emitted by said cathode (31) cross said accelerating grid (33; 133; 133') in directions substantially parallel to a direction (F).

14. The vacuum gauge as claimed in claim 13, wherein said plate (35) lies in a plane substantially perpendicular to the direction according to which the electrons cross said accelerating grid (33; 133; 133').

15. The vacuum gauge as claimed in claim 1, wherein most of the electrons emitted by said cathode (31) cross said accelerating grid (33; 133; 133') only once.

16. The vacuum gauge as claimed in claim 13, wherein said plate (35) lies in a plane substantially parallel to the direction according to which the electrons cross said accelerating grid (33; 133; 133'), and wherein a distance between said cathode (31) and said accelerating grid (33; 133; 133') is substantially smaller than a distance between said cathode (31) and said plate (35).

17. The vacuum gauge as claimed in claim 16, wherein the distance between said cathode (31) and said accelerating grid (33; 133; 133') is preferably in a range of 20 to 50 μm, and the distance between said cathode (31) and said plate (35) is preferably smaller than 550 μm.

18. The vacuum gauge as claimed in claim 1, further comprising means for generating an electric and/or magnetic field directed for increasing the length of the path travelled by said electrons between said accelerating grid (33) and said plate (35), said generating means comprises a pair of permanent magnets or electromagnets (25).

19. The vacuum gauge as claimed in claim 1, further comprising an extraction device (37) for channelling the ions and/or molecules towards said plate (35).

20. The vacuum gauge as claimed in claim 19, wherein said extraction device (37) comprises an electrostatic lens connected to a power supply (16) keeping the lens at a potential different from zero and lower than a potential of said accelerating grid (13; 33; 133; 133').

21. The vacuum gauge as claimed in claim 1, further comprising means for generating an electric and/or magnetic field directed so as to deflect the ions and/or the ionised molecules according to a predetermined direction, said means comprises a pair of curved plates (47; 51) defining therebetween a passageway for the ions and/or the ionised molecules generated by the electron beam and directed towards said plate (35).

22. The vacuum gauge as claimed in claim 21, wherein the ions and/or said ionised molecules are deflected while traveling through the passageway defined between said curved plates (47; 51) in a range of 0° to 180°.

23. The vacuum gauge as claimed in claim 22, wherein the ions and/or said ionised molecules are deflected to about 90°, and wherein said plate (35) is substantially parallel to said cathode (31).

24. The vacuum gauge as claimed in claim 22, wherein the ions and/or said ionised molecules are deflected to about 180°, and wherein said plate (35) is substantially perpendicular to said cathode (31).

25. The vacuum gauge as claimed in claim 21, wherein said means for generating an electric and/or magnetic field comprises: a pair of plates (47; 51) and a capacitor (45; 49), a first plate of said pair being grounded and a second one being suitably biased.

26. The vacuum gauge as claimed in claim 1, further comprising means (23) for processing a signal generated by said galvanometer (21) to produce a signal representative of the gas pressure inside said container (10).

* * * * *